United States Patent Office 3,286,959
Patented Nov. 22, 1966

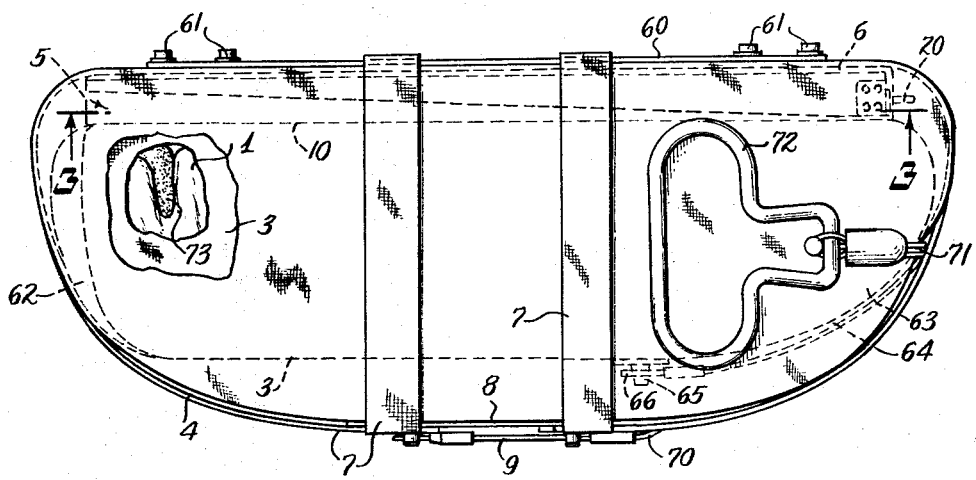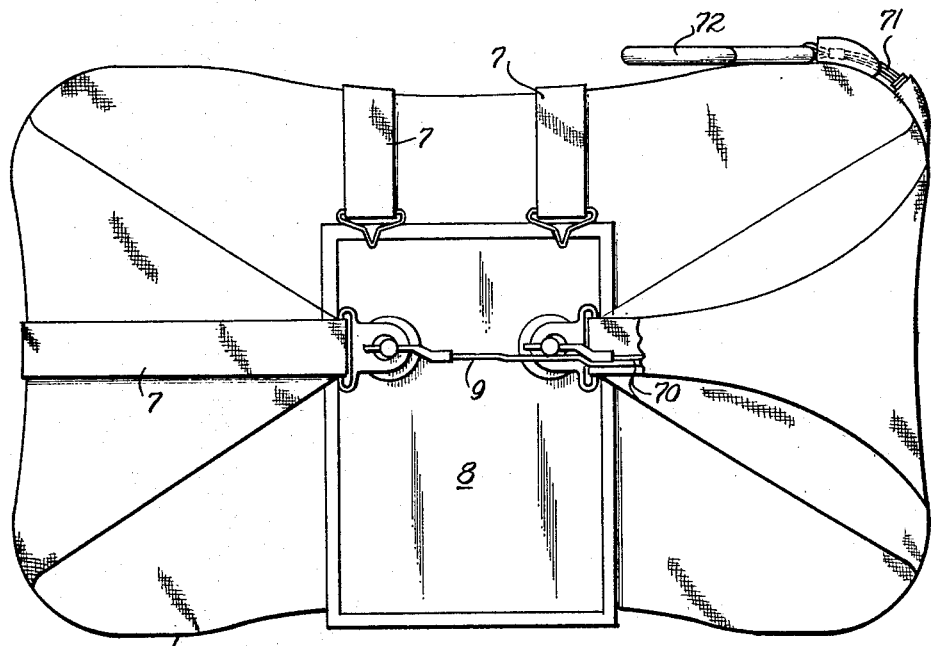

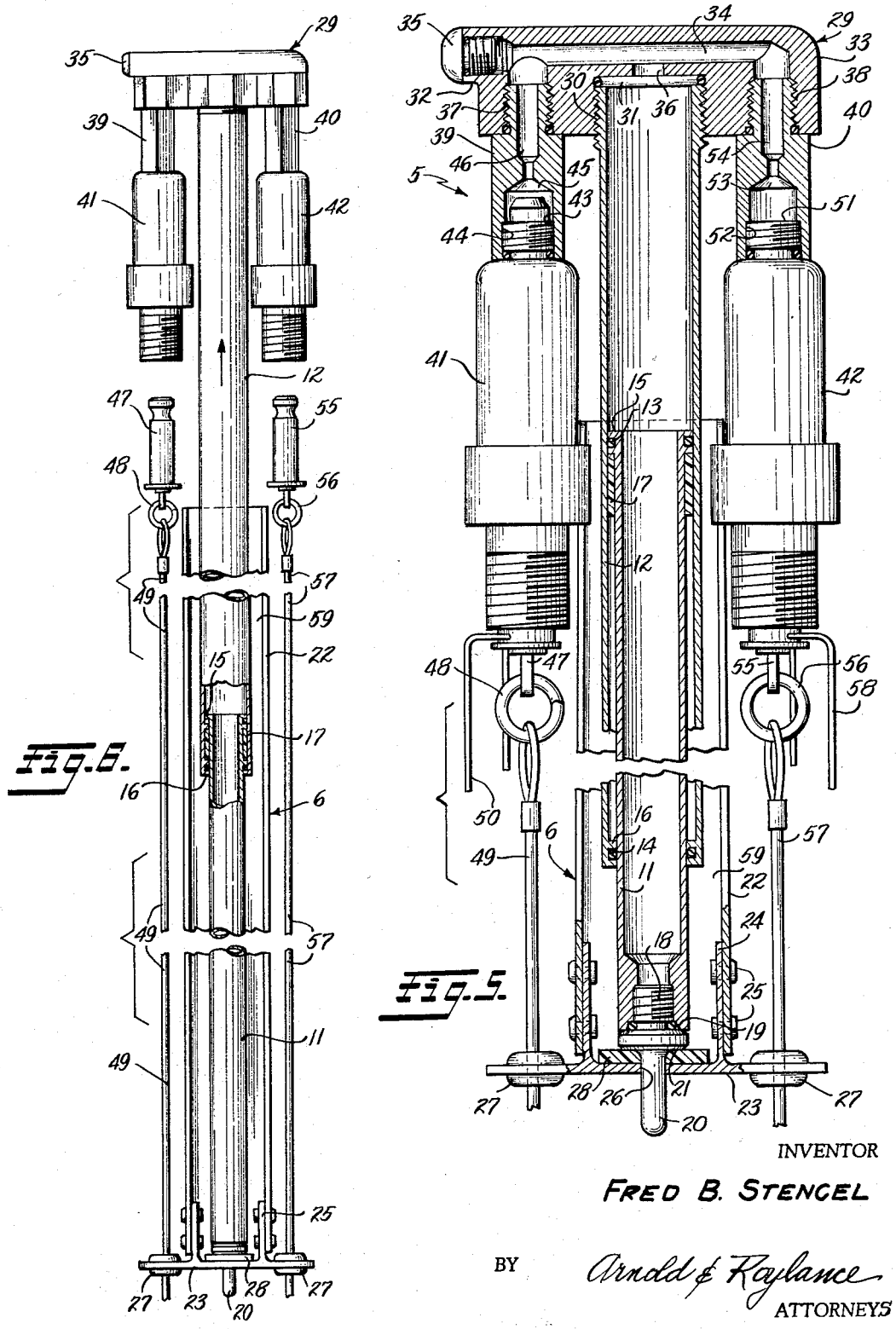

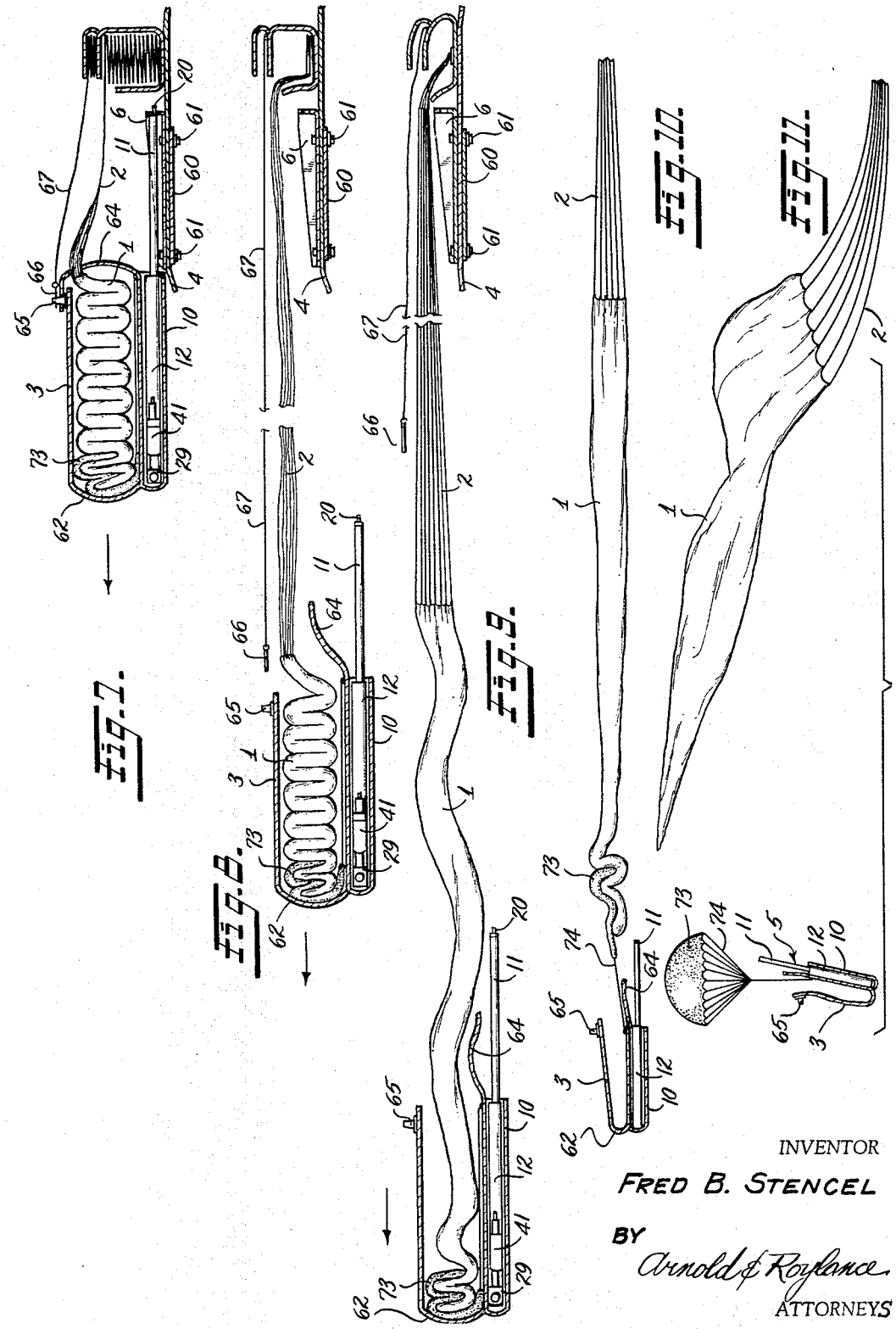

3,286,959
POWER DEPLOYED PARACHUTE APPARATUS
Fred B. Stencel, Asheville, N.C., assignor to Stencel Aero Engineering Corporation, Asheville, N.C., a corporation of North Carolina
Filed Apr. 19, 1965, Ser. No. 449,236
12 Claims. (Cl. 244—148)

This invention relates to parachute apparatus and more particularly to an improved power projected or deployed parachute apparatus which, though useful for other purposes, is particularly adapted to be employed as a reserve or secondary parachute to be called into action when the primary recovery parachute fails.

Since parachutes are not totally dependable, the possibility of malfunction must be recognized and guarded against, especially when the parachute is to be used to recover a person, and it is common practice to provide a secondary or reserve parachute which can be relied upon in event of failure of the main parachute. Unfortunately, the conditions and manners of failure of the main parachute vary rather widely and prior-art workers have found it difficult to provide a secondary parachute apparatus which could be depended upon under all of the possible situations of primary parachute failure.

At one extreme, the main parachute may fail totally, so that the canopy is not even partially deployed and, therefore, exerts no significant aerodynamic effect on the load. In such a case, the body to be recovered may tumble and, in any event, will assume no predictable attitude. At the other extreme, only a partial failure of the primary parachute may occur, with the canopy streaming adequately to stabilize the load in a predictable attitude, or even with the canopy substantially spread but with the rate of descent so high as to make ground impact hazardous. If prior-art reserve or secondary parachutes are activated at a time when the load is tumbling, there is, at worst, an unduly high danger of general failure to deploy and spread and, at best, the problem of entanglement of the load with the suspension lines. In instances where the primary parachute has deployed and at least partially inflated but is still not adequately effective to slow the descent of the load, prior-art reserve parachutes have tended to drift up into the main parachute canopy to entangle therewith and, by partially blanketing the main canopy, cause further collapsing and thereby aggravate, rather than help, the situation.

Since reserve parachutes are frequently employed by personnel in situations where other persons are near, either during descent or prior thereto, another difficulty is introduced. The problem of providing a dependable reserve parachute demands power projection or deployment of the reserve canopy, as by what has become known as a drogue gun, but such a device, if adequately powerful to assure successful operation of the reserve parachute, constitutes a hazard to others near the person using the reserve parachute. In the case of military paratroops, this danger exists even on the ground because of the possibility of inadvertent activation of the reserve parachute.

A general object of the present invention is to devise a reserve or secondary parachute in which the aforementioned difficulties are overcome.

Another object is to provide a power projected or deployed parachute which is specially useful as a reserve parachute and which can be successfully employed under all of the possible circumstances of main parachute failure.

A further object is to provide a power projected parachute apparatus which, though dependable in use, does not constitute a danger to nearby personnel.

Yet another object is to devise a parachute which can be successfully deployed from a tumbling load descending at its terminal rate of free fall and which also, when used as a reserve parachute, will assure avoidance of entanglement or other interference with the main parachute when deployed at extremely low sink rates.

Stated generally, the invention is based on use of a power device to project a fully packed parachute canopy, a part of the projected pack then being brought into action as a "stretch mass" effective to stretch out the canopy to fully deployed condition. Typically, a ballistic projection gun is used and is combined with the packed canopy in such fashion that the entire projection gun leaves the load and travels with the canopy, the projecting gun then serving as part of the stretch mass and ultimately being completely separated from the canopy after deployment has been accomplished.

In order that the manner in which the foregoing and other objects are achieved in accordance with the invention can be understood in detail, one particularly advantageous embodiment thereof will be described with reference to the accompanying drawings, which form a part of this specification, and wherein:

FIG. 1 is a top plan view of a fully packed parachute constructed in accordance with the invention for use as a reserve parachute;

FIG. 2 is a front elevational view of the fully packed parachute of FIG. 1;

FIG. 5 is a longitudinal sectional view of the projecting or deploying gun of the parachute of FIG. 1, taken on line 5—5, FIG. 4;

FIG. 6 is a side elevational view of the deploying gun, showing the same immediately after actuation; and FIGS. 7–11 are semi-diagrammatic views illustrating successive stages of deployment of the parachute resulting from operation of the deploying gun.

Figure 3:
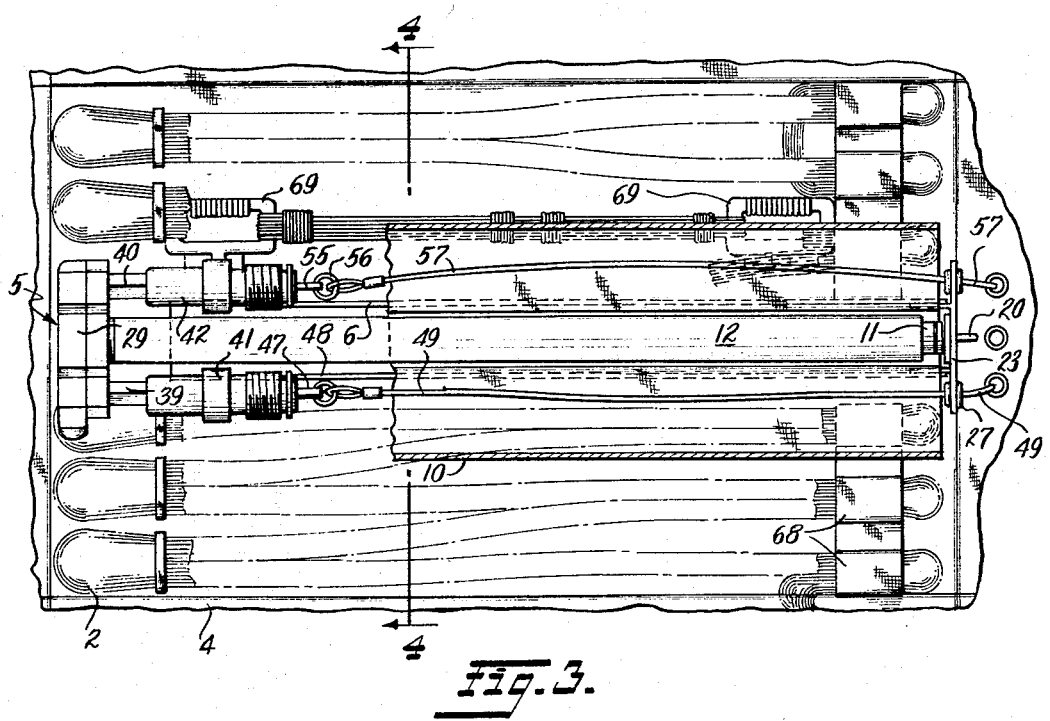
FIG. 3 is a fragmentary elevational view, taken on line 3—3, FIG. 1.

Referring now to the drawings in detail, the embodiment of the invention illustrated comprises a parachute canopy 1 equipped with suspension lines 2, FIGS. 7–11, and initially packed within a canopy bag 3, the packed canopy and canopy bag being initially contained within an outer bag 4, FIGS. 1–4. Also contained in outer bag 4, and retained on the canopy bag 3, is a power operated projection or deployment device indicated generally at 5 and shown in detail in FIGS. 5 and 6. Device 5 is positioned and secured by a bracket 6 also contained in outer bag 4, bracket 6 being secured to bag 4. When the parachute is fully packed and ready for use, as seen in FIGS. 1 and 2, the outer bag is maintained closed by straps 7, closure panel 8, and pull-ties 9, the entire pack being secured to the load (not shown), as by the usual harness.

Figure 4:
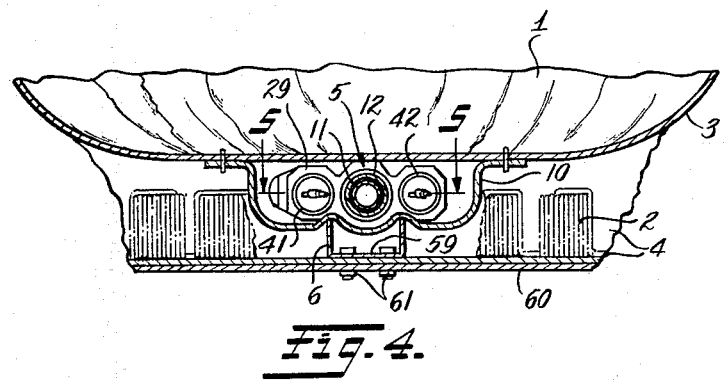
FIG. 4 is a transverse sectional view taken on line 4—4, FIG. 3.

The power operated device 5, hereinafter referred to as the projection gun, is retained within an elongated pouch 10 which, as best seen in FIG. 4, is defined by a piece of fabric sewed along its side edges, and at one end, to that portion of the canopy bag 3 which is to lie adjacent bracket 6 in the full assembly, one end of the pouch 10 being open. The projection gun itself includes a smaller tube 11 and a larger tube 12, the latter being telescopically and slidably engaged over the smaller tube in fluid-tight fashion, seals being provided as by an O-ring 13 at the end of tube 11 disposed within tube 12 and an O-ring 14 at the end of tube 12 engaged around tube 11. The inner end of tube 11 is provided with an outwardly projecting transverse annular flange 15. The end of tube 12 engaged around tube 11 is provided with an inwardly projecting transverse annular flange 16. An impact-reducing cushion ring 17 surrounds tube 11 at flange 15. The arrangement is such that, as seen in FIG. 6, axial movement of tube 12 away from tube 11 causes flange 16 to engage the adjacent end of ring 17 so that the ring is engaged between flanges 15 and 16 and further movement of tube 12 away from tube 11 is resisted.

The end of tube 11 opposite flange 15 is closed and sealed by the combination of a threaded plug 18 and an O-ring 19. Plug 18 includes an extension 20 which is of reduced diameter and extends axially of the projection gun. Plug 18 presents a transverse annular shoulder 21 directed toward the tip of extension 20.

Bracket 6 includes an elongated rigid member 22 which is of U-shaped transverse cross section and open at both ends. At one end of the member 22, there is provided a flat plate 23 equipped with spaced parallel flanges 24, each of the flanges 24 extending in face-to-face contact with a different one of the side walls of member 22 and being secured rigidly thereto, as by rivets or other fasteners 25. Plate 23 is provided with a centrally located circular aperture 26 capable of slidably embracing extension 20. The end portions of plate 23 project well beyond flanges 24 and are provided with openings to accommodate guide eyelets 27. In the area of plate 23 between flanges 24, there is attached to plate 23 a cushion member 28 having a central aperture to accommodate extension 20.

The outer tube 12 is exteriorly threaded at its end opposite flange 16. A header member 29 is provided, the header member having a cylindrical, interiorly threaded bore at 30, the threads of which are engaged with the exterior threads on tube 12 to secure the header member rigidly to the end of the tube. An O-ring is provided at 31 to effect a fluid-tight seal between the header member 29 and tube 12. Header member 29 is elongated transversely of the projection gun and includes end portions 32 and 33 each disposed at a different side of tube 12. A cross bore 34 is provided in the body of member 29 and opens laterally through end portion 32, this opening being closed by a threaded plug 35. A central port 36 is provided, this port being centered on the longitudinal axis of tube 12 and effecting communication between the cross bore 34 and the interior of tube 12.

End portion 32 of header member 29 is provided with an interiorly threaded bore 37 which communicates with cross bore 34 and opens toward the opposite end of tube 12. Similarly, end portion 33 of the header member is provided with an interiorly threaded bore 38 communicating with cross bore 34 and opening in the same direction as bore 37. Bores 37 and 38 are parallel with the central axis of the projection gun and are spaced outwardly from tube 12. Two identical adaptors 39 and 40 are employed, each having an exteriorly threaded end portion, the threaded end portion of adaptor 39 being engaged in bore 37 and the threaded end portion of adaptor 40 being engaged in bore 38. Each adaptor 39, 40 serves to mount a conventional pyrotechnic initiator 41 and 42, respectively. The details of the initiators 41 and 42 form no part of the invention and it is sufficient to understand that conventional devices of this type are activated, by withdrawal of a firing pin, to produce expanding combustion gases as a result of ignition of a pyrotechnic charge. Thus, the initiator 41 includes a tip portion 43 which is exteriorly threaded and securely engaged in an interiorly threaded bore portion 44 of adaptor 39, the arrangement being such that the combustion gases produced by initiator 41 are discharged through tip portion 43 into the bore of the adaptor. Downstream from bore portion 44, the bore of adaptor 39 includes a convergent-divergent nozzle 45 through which the expanding combustion gases are discharged into bore portion 46 and thence into cross bore 34. The firing pin 47 of initiator 41 is connected, as by ring 48, to a firing line 49 which extends through one of the guide eyelets 27. The initiator is provided with the usual safety pin which can be withdrawn by an arming line 50. Identical with initiator 41, the initiator 42 includes an exteriorly threaded tip portion 51 secured in an interiorly threaded bore portion 52 of adaptor 40. The bore of adaptor 40 includes a nozzle 53 and an end portion 54 for conveying the expanding combustion gases from initiator 42 into cross bore 34. Initiator 42 includes a firing pin 55 connected by ring 56 to a firing line 57 which extends through the other guide eyelet 27. The safety pin of initiator 42 can be withdrawn by the arming line 58.

The safety pins of the initiators 41 and 42 having first been released, substantially simultaneous actuation of the firing pins 47 and 55 will result in simultaneous firing of both initiators so that both initiators serve to deliver expanding combustion gases into the cross bore 34 and, hence, into the interior of tube 12 and the interior of tube 11. Since the opposite end portion of tube 11 is closed by plug 18, the increasing pressure within tubes 11 and 12 which results from the expanding combustion gases causes tube 11 to be forced against plate 23 and tube 12 to be accelerated away from plate 23, sliding telescopically along tube 11 until shoulder 15 engages cushion ring 17 and relative movement between tubes 11 and 12 is impeded. Since the energy provided by the expanding combustion gases from the two initiators is of considerable magnitude, this telescopic sliding action occurs very rapidly, with a large acceleration of the mass constituted by the assembly comprising tube 12, header member 29, adaptors 39 and 40, and initiators 41 and 42. Hence, once the engagement of cushion ring 17 between flanges 15 and 16 has occurred, the combination of tubes 11 and 12, plus header member 29, the two adaptors and the two initiators continues in projected flight along a path of travel initially determined by bracket 6. Since the entire projection gun 5 is contained within pouch 10, and since that pouch is secured to canopy bag 3, the entire canopy bag, and the packed canopy contained therein, necessarily travels with the projected combination of the tubes 11 and 12, header member 29, and the adaptors and initiators. In this connection, it is to be noted that the open end of pouch 10 is adjacent plate 23, and that the portion of the projection gun comprising header member 29 is fully restrained within the closed end of pouch 10.

As best seen in FIG. 4, the base web 59 of the channel-shaped bracket 6 is disposed in direct engagement with the inner face of the fabric of outer bag 4. On the outside of the outer bag 4, in the area occupied by bracket 6, there is provided a stiff plate 60, to which the retaining straps and harness can be directly attached. The bracket 6 is secured to the fabric of outer bag 4 and to plate 60 by suitable fasteners 61 which extend through grommets in the fabric of the outer bag.

Considering now FIGS. 1, 3, 4 and 7, the canopy 1 of the parachute, properly packed, is completely enclosed within the canopy bag 3, and all of the lines employed are arranged outside of the canopy bag. The canopy bag can be considered as elongated in a direction from left to right, as viewed in FIG. 1, and as having one end 62 which is closed, the opposite end 63 of the canopy bag being open for insertion and extraction of the canopy. A closure flap 64 is provided and can be retained in closed position, as by the usual closing cone 65 and releasable ripcord pin 66, FIGS. 1, 7 and 8. The suspension lines 2 extend from the packed canopy out of the bag around flap 64 in a fashion well known in the art. Pin 66 is attached to one end of a static line 67.

As will be seen in FIGS. 1, 3 and 4, the suspension lines 2 are stowed in the space between canopy bag 3 and outer bag 4, the suspension lines being equally distributed on both sides of the location of the projection gun. The suspension lines are releasably retained in their stowed condition by retaining loops 68 which are sewed or otherwise suitably affixed to the inner surface of the fabric of the outer bag, and by rubber bands at 69, FIG. 3. At their ends opposite the canopy, the suspension lines are secured, as by rings 69, to plate 60 and, therefore, to the harness by which the parachute assembly is secured to the load to be recovered.

Also stowed in the space between the canopy bag 3 and the outer bag 4, the static line 67 extends between pin 66 and any suitable point on the assembly which is fixed relative to the load to be recovered. Thus, the end of the static line can simply be attached to one of the rings 69. As described in detail hereinafter, the purpose of the static line is to withdraw pin 66 from closing cone 65, freeing flap 64, at the proper time during projection of the parachute. For this reason, static line 67 is substantially shorter than are the suspension lines 2.

The arming lines 50 and 58, and the firing lines 49 and 57, for initiators 41 and 42, as well as the ripcord 70, FIG. 2, for opening outer bag 4, emerge from the outer bag as a ripcord assembly indicated generally at 71, FIG. 1, to which is attached the pull ring 72. Hence, the user can simply pull ring 72 to accomplish opening of the outer bag and arming and firing of the initiators for the projection gun.

Also packed within canopy bag 3, as will be clear from FIGS. 1 and 7–10, is a small parachute canopy 73 which is equipped with suspension lines 74 attached directly to the canopy bag 3 at a point adjacent open end 63 thereof. This additional small parachute serves both as a recovery parachute for the combination of the canopy bag and the projection gun, and as a friction flap operative in the terminal stages of deployment of the main canopy 1 for assuring full stretching out of the main canopy. In this embodiment, the main canopy 1, when packed within bag 3, is arranged in a sinusoidal series of folds, with the apex of the main canopy located at the closed end 62 of bag 3, and the skirt of the canopy located at end 64 of bag 3. The auxiliary canopy 73 is also arranged in a series of sinusoidal folds and the folds of the auxiliary canopy are interleaved with the folds of the main canopy at the apex of the main canopy.

In a typical application, the parachute apparatus illustrated and just described is employed as a reserve parachute, especially for military personnel. Using any suitable harness, the parachute, in fully packed and assembled condition as seen in FIG. 1, is secured to the wearer in such fashion that the parachute pack is in front of the wearer's chest and the line of projected flight resulting from operation of the projection gun 5 extends laterally away at one side of the wearer.

Operation of the apparatus is initiated when the wearer pulls ring 72 to open the outer bag and arm and fire the initiators 41 and 42 of the projection gun. Upon firing of the initiators, the assembly of tubes 11 and 12 is telescopically elongated, as will be understood by comparison of FIGS. 5 and 6, and the resulting acceleration of the combination including tube 11, tube 12, header member 29, adapters 39 and 40, and initiators 41 and 42 is effective to project laterally away from the wearer not only the projection gun itself but also the full canopy pack, consisting of bags 3, canopy 2, and auxiliary canopy 73. At this stage, it will be understood that the outer bag ripcord 70 has been effective to release pull-ties 9 and that the outer bag 4 will have properly unfolded so that the outer bag in no way impedes the projection of the combination of the canopy bag and its contents, and the projection gun.

Referring now to FIGS. 7–11, it will be understood that, as the projected flight of the canopy bag and the projection gun continues, the suspension lines 2 and the static line 67 are unfurled progressively until, as seen in FIG. 8, static line 67 becomes taut and withdraws pin 66 from the closing cone 65 so that flap 64 is now free and the main canopy 1 can be withdrawn progressively from canopy bag 3. As the projected flight continues, canopy 1 is progressively deployed until, as seen in FIGS. 9 and 10, even the apex portion of canopy 1 has been withdrawn from bag 3. At this stage, frictional engagement between the apex portion of canopy 1 and the auxiliary canopy 73 causes the auxiliary canopy also to withdraw from bag 3. The combination of bag 3 and gun 10 still continues its projected flight and, therefore, the suspension lines 74 of the auxiliary parachute become taut, and, with the combination of the canopy bag and projection gun still traveling, the auxiliary parachute serves to straighten out the last remaining folds of the main canopy, so that the main canopy streams completely as seen in FIG. 11 and is ready for aerodynamic spreading. Upon disengagement from the main canopy, auxiliary canopy 73 in turn inflates, so that the combination of canopy bag 3 and projection gun 5 now descends under control of the auxiliary parachute.

The projected combination of the canopy bag 3 and the projection gun 5 can be considered as constituting a stretch mass which is effective to fully stretch out canopy 1 and suspension lines 2 but which separates automatically from the canopy 1 as soon as full deployment is achieved, as will be clear from FIGS. 10 and 11. Separation of the stretch mass from the canopy is important because, were the stretch mass to remain attached to the apex of the canopy, it would then pull the apex downwardly, tending to invert the canopy and prevent inflation, when deployment is attempted at low sink rates.

Since the circumstances under which the parachute apparatus may be called into action cannot be predetermined, the apparatus must be capable of operating dependably even if the load is tumbling in free fall, at the time of actuation of the projection gun 5, and the attitude of the load is such at the instant of projection that the combination of the canopy bag, canopy and gun is projected downwardly (upstream). Under these circumstances, if the projection gun 5 is sufficiently powerful to assure complete deployment, even in view of the upstream projection, the deployed canopy would be carried up by the airstream and could therefore wrap around the load before inflating. To avoid this possibility, the projection gun 5 is designed to provide an accurately predetermined projection impulse which, in view of the known free fall velocity for the particular load (e.g., 230 feet per second for the average person), will assure that the aerodynamic forces on the upstream projected canopy bag will arrest the bag before the suspension lines are fully stretched out. The canopy bag will then stop and be carried upwardly past the load, the bag being opened and the canopy then being extracted from its bag when the lines become taut in a trailing direction.

Though the type of self-contained ballistic projecting unit illustrated and described is particularly advantageous, it will be understood that other types of power operated projecting devices can be employed without departing from the scope of the invention as defined in the appended claims.

What is claimed is:
1. In a power deployed parachute apparatus, the combination of
   a parachute canopy;
   a canopy container,
      said canopy being packed in said container and withdrawable therefrom;
   outer container means attachable to the load to be handled by the parachute apparatus,
      said canopy container, with said canopy packed therein, being enclosed by said outer container means and said outer container means being openable to free said canopy container for projection away from the load;
   suspension line means attached to said canopy and extending from said canopy container,
      said suspension line means being stowed in said outer container means and attached to a point which is fixed with respect to the load when said outer container means is attached to the load;

support means secured to said outer container means;

a power projection device secured to said canopy container and releasably disposed on said support means, said projection device being operative, when actuated, to project the combination of said canopy container, said canopy, and said projection device away from said support means and said outer container means with sufficient momentum to fully deploy said canopy and cause the combination of said canopy container and said projection device to separate from said canopy and travel beyond the same once said canopy has been deployed with said suspension line means in stretched out condition, the effective length of said suspension line means being such that said suspension line means becomes fully stretched out while the combination of said canopy container and said projection device retains sufficient momentum to cause said canopy to be withdrawn from said canopy container; and means for opening said outer container means and actuating said projecting device.

2. A parachute apparatus according to claim 1 and further comprising flexible friction means disposed in said canopy container in direct frictional engagement with the apex portion of said canopy and attached to said canopy container, said friction means stretching out said apex portion of said canopy, to complete deployment of said canopy, as the combination of said canopy container and said projection device continues its projected flight beyond said canopy.

3. A parachute apparatus according to claim 2, wherein said flexible friction means is of fabric, said apex portion of said canopy being disposed in a series of successive folds in said canopy container and said flexible friction means being disposed in a series of successive folds which are interleaved with the folds of said apex portion of said canopy.

4. A parachute apparatus according to claim 2, wherein said flexible friction means is an auxiliary parachute canopy connected to the combination of said canopy container and said projection device to recover the same.

5. A parachute apparatus according to claim 1, wherein said canopy container has an opening, through which said canopy can be withdrawn, and is provided with releasable closure means for said opening, the apparatus further including restraining line means connected between said outer container means and said releasable closure, said restraining line means being of such effective length as to become taut for automatic release of said closure means prior to withdrawal of said canopy from said canopy container.

6. A parachute apparatus according to claim 1, wherein said projection device is disposed outside of said canopy container.

7. A parachute apparatus according to claim 1, wherein said canopy container is provided with an exterior pouch having a closed end and an open end, and said projection device is disposed in said pouch.

8. A parachute apparatus according to claim 1, wherein said projection device is a self-contained ballistic unit having a leading end portion and a trailing end, said trailing end engaging said support means; and said canopy container is provided with exterior means confining said leading end portion.

9. A parachute apparatus according to claim 1, wherein said projection device is a self-contained ballistic unit comprising two telescopically related members slidably interengaged for axial movement relative to each other between a first, telescoped position and a second, extended position, said members being provided with cooperating means engageable to prevent further extension when said members are telescopically extended to said second position, and means establishing a driving force for driving said members telescopically from said first position to said second position, one of said members being restrained against movement under the influence of said driving force when said projection device is disposed on said support means.

10. A parachute apparatus according to claim 1 and constructed for use in connection with a particular load which will have a known free fall terminal velocity, under atmospheric conditions, wherein said projection device is operative to deliver a predetermined projection impulse the magnitude of which is inadequate to project the combination of said canopy container, said canopy, and said power projection device downwardly, under conditions of free fall at terminal velocity, through such a distance as to render said suspension lines taut.

11. In a power deployed parachute apparatus, the combination of a canopy;

a canopy container, said canopy being packed in said container and withdrawable therefrom;

fabric outer container means capable of enclosing said canopy container when said canopy is packed therein;

suspension line means attached to said canopy and extending from said canopy container, said suspension line means being stowed between said canopy container and said outer container means when the latter encloses said canopy container;

a support bracket secured to said outer container means and positioned between the same and said canopy container;

a self-contained ballistic projection device releasably positioned on said support bracket and disposed exteriorly of said canopy container;

means attaching said ballistic projection device to said canopy container, actuation of said projection device resulting in projection of the combination of said canopy container, said canopy, and said projection device; and means for opening said outer container means and actuating said projection device.

12. In a power deployed parachute apparatus, the combination of a canopy;

a canopy container having a closed end and an open end, said canopy being packed in said container for withdrawal via said open end;

a self-contained ballistic unit comprising a first tubular member, a second tubular member, said tubular members being telescopically engaged one over the other for relative axial movement between a first, telescoped position and a second, extended position, one end of one of said members constituting the trailing end of said ballistic unit, and one end of the other of said members constituting the leading end of said ballistic unit, said tubular members being provided with cooperating means engageable to prevent further telescopic extension when said members are extended to said second position, and means for establishing fluid pressure within said tubular members effective to drive the same from said first position to said second position; and support means to be mounted on the load to be recovered by the parachute, said support means being constructed and arranged to releasably support said ballistic unit and including abutment means releasably engaged by said one end of said one member to restrain said one member against axial movement in a direction toward said second position, whereby driving of said members to said second position causes said ballistic unit to be projected axially away from said support means; and means attaching said ballistic unit to said canopy container for projection of said container, with said canopy packed therein, with said ballistic unit.

References Cited by the Examiner

UNITED STATES PATENTS 2,979,294 4/1961 Buss _____ 244—148
3,133,718 5/1964 Stencel _____ 244—149 X

FOREIGN PATENTS 74,642 12/1960 France.

MILTON BUCHLER, *Primary Examiner.*

ALFRED E. CORRIGAN, *Examiner.*